United States Patent [19]

Abraham

[11] Patent Number: 4,946,325
[45] Date of Patent: * Aug. 7, 1990

[54] EXPANSION ANCHOR STUD

[76] Inventor: Frederic C. Abraham, P.O. Drawer 385, Pequannock, N.J. 07440-0142

[ * ] Notice: The portion of the term of this patent subsequent to Dec. 6, 2005 has been disclaimed.

[21] Appl. No.: 279,956

[22] Filed: Dec. 5, 1988

Related U.S. Application Data

[63] Continuation-in-part of Ser. No. 832,991, Feb. 26, 1986, Pat. No. 4,789,282.

[51] Int. Cl.⁵ ............................................. F16B 13/04
[52] U.S. Cl. ...................................... 411/24; 411/26; 411/28; 411/55; 411/63
[58] Field of Search ..................................... 411/24–28, 411/34, 35, 44, 45, 49–51, 55, 58, 60, 63–65

[56] References Cited

U.S. PATENT DOCUMENTS

| | | | |
|---|---|---|---|
| 719,426 | 2/1903 | Boone | 411/26 |
| 1,513,669 | 10/1924 | Nicewarner | 411/24 |
| 1,957,533 | 5/1934 | Gelpcke | 411/24 |
| 2,028,881 | 1/1936 | Saleh | 411/24 |
| 2,143,086 | 1/1939 | Pleister | 411/28 |
| 3,202,034 | 8/1965 | Korenchan | 411/24 |
| 3,432,214 | 3/1969 | Cashman | 411/24 X |
| 4,478,542 | 10/1984 | Whelan | 411/26 |
| 4,537,541 | 8/1985 | Giannuzzi | 411/55 |
| 4,702,656 | 10/1987 | Kerrom | 411/45 X |
| 4,789,282 | 12/1988 | Abraham | 411/55 X |
| 4,818,163 | 4/1989 | Beretter | 411/44 |
| 4,832,548 | 5/1989 | Strobel | 411/55 X |

FOREIGN PATENT DOCUMENTS

| | | | |
|---|---|---|---|
| 0062280 | 10/1982 | European Pat. Off. | 411/27 |
| 2547634 | 4/1977 | Fed. Rep. of Germany | 411/55 |
| 2803711 | 8/1979 | Fed. Rep. of Germany | 411/24 |
| 3105038 | 9/1982 | Fed. Rep. of Germany | 411/24 |
| 0121053 | 3/1948 | Sweden | 411/24 |
| 1315957 | 5/1973 | United Kingdom | 411/28 |
| 2016106 | 9/1979 | United Kingdom | 411/24 |

Primary Examiner—Gary L. Smith
Assistant Examiner—Suzanne L. Dino
Attorney, Agent, or Firm—Gerald E. Linden

[57] ABSTRACT

An expansion anchor stud comprises an expansion anchor for gripping a hole in a surface, an axially-aligned, externally threaded stud of substantially the same outside diameter as the anchor and engaging the distal end of the anchor, and an axially-aligned bolt extending through a hole in the anchor and engaging the stud. A head on the proximal end of the bolt abuts the proximal end of the anchor, and external threads on the bolt engage internal threads in a hole extending through the stud. The anchor is expanded by a tool inserted into the distal end of the hole in the stud to engage the distal end of the bolt and rotate the bolt relative to the stud, thereby axially compressing, and hence expanding, the anchor. The distal end of the stud extends, in use, through a hole in a panel being mounted to the surface so that a nut may be threaded onto the external threads of the stud to secure the panel to the surface.

The distal end of the bolt is provided with a recess, slot, crossed slot or the like, for receiving an Allen wrench, the blade of a screwdriver, the tip of a Phillips head screwdriver, or the like, respectively.

The expansion anchor is preferably of the double expansion type having a first expansion member disposed at its distal end and a second expansion member disposed at its proximal end, and the proximal expansion member may be unitary with the head of the bolt.

13 Claims, 2 Drawing Sheets

EXPANSION ANCHOR STUD

This application is a continuation-in-part of commonly-owned U.S. Pat. No. 4,789,282, entitled EXPANSION ANCHOR STUD, and filed on Feb. 26, 1986.

TECHNICAL FIELD OF THE INVENTION

The invention relates to expansion type fasteners, and more particularly to an expansion anchor stud.

BACKGROUND OF THE INVENTION

Expansion type anchor bolts are known for many uses that require a bolt to be held strongly within a particular surface. A frequent use of anchor bolts is to secure a member, such as a wood panel, to a surface, such as concrete or cinderblock. Typical anchor bolts require a larger hole in the surface than in the panel. This can be inconvenient for the installer since the surface cannot be drilled with the panel in place. These problems are discussed in Whelan, Jr. U.S. Pat. No. 4,478,542, issued in 1984 and entitled EXPANSION ANCHOR GRIP SLEEVE. Whelan discloses a grip sleeve surrounding the bolt in the panel hole so that the panel hole may be of the same diameter as the underlying hole in the surface. The grip sleeve functions as a hole spacer and also restrains the anchor element from rotating during installation so that it can be expanded by insertion of the bolt to grip the hole in the surface.

A need for expansion type anchor studs, in other words devices that can be anchored in a surface with a threaded stud protruding therefrom for receiving a nut, also exists, and is constrained by analogous hole size problems such as have been discussed above.

Nicewarner et. al. U.S. Pat. No. 1,513,669, issued and entitled EXPANSIBLE BOLT, discloses a device especially adapted for use in structural iron work as a substitute for rivets, that comprises a hollow, slotted cylindrical member which is threaded at one end, ar expander in the form of a tapered pin extending through the cylindrical member and terminating in a threaded portion extending past the threaded end of the cylindrical member, and a a nut engaging the threaded end of the expander to expand the cylindrical member. A nut threaded over the threaded end of the cylindrical member and a head at the opposite end of the cylindrical member act in concert to clamp two pieces of structural iron, both having holes therethrough, together. Nicewarner inherently addresses the "same hole size in both members" problem, since it is a rivet which is inserted from one side of the two ultimately fastened together members and which is tightened from the other side thereof. However, Nicewarner does not address the problems associated with anchor bolts and anchor studs, as discussed above, since both anchor blots and anchor studs are required to be used in "blind" hole applications. In other words, the hole in the surface does not extend all the way therethrough.

DISCLOSURE OF THE INVENTION

Therefore, it is an object of this invention to provide an expansion anchor stud that is insertable through a hole in a panel into a blind hole in an underlying surface, the hole in the panel and the hole in the surface being of substantially the same diameter to effect the advantages alluded to hereinbefore and described hereinafter.

According to the embodiment of the invention in the parent application, an expansion anchor stud comprises an expansion anchor (shield) for gripping a hole in a surface, an axially-aligned, externally-threaded stud of substantially the same outside diameter as the anchor and engaging the distal end of the anchor for extending through a hole in a panel mounted to the surface, and an axially-aligned bolt extending through a hole in the stud and engaging the anchor. The disclosure or U.S. Pat. No. 4,789,282 is incorporated by reference herein.

According to the present invention, an expansion anchor stud comprises an expansion anchor (shield) for gripping a blind hole in a surface, an axially-aligned, externally threaded stud of substantially the same outside diameter as the anchor and engaging the distal end of the anchor, and an axially-aligned bolt extending through a hole in the anchor and engaging the stud. A head on the proximal end of the bolt abuts the proximal end of the anchor, and external threads on the bolt engage internal threads in a hole extending through the stud. The anchor is expanded by a tool inserted into the distal end of the hole in the stud to engage the distal end of the bolt and rotate the bolt relative to the stud, thereby axially compressing, and hence expanding, the anchor. The distal end of the stud extends, in use, through a hole in a panel being mounted to the surface so that a nut may be threaded onto the external threads of the stud to secure the panel to the surface.

According to an aspect of the invention, the distal end of the bolt is provided with a recess, slot, crossed slot or the like, for receiving an Allen wrench, the blade of a screwdriver, the tip of a Phillips head screwdriver, or the like, respectively.

According to a feature of the invention. the expansion anchor is preferably of the double expansion type having a first expansion member disposed at its distal end and a second expansion member disposed at its proximal end, and the second expansion member is unitary with the head of the bolt.

Other objects, features and advantages of the invention will become apparent in light of the following description thereof.

Figure 5:
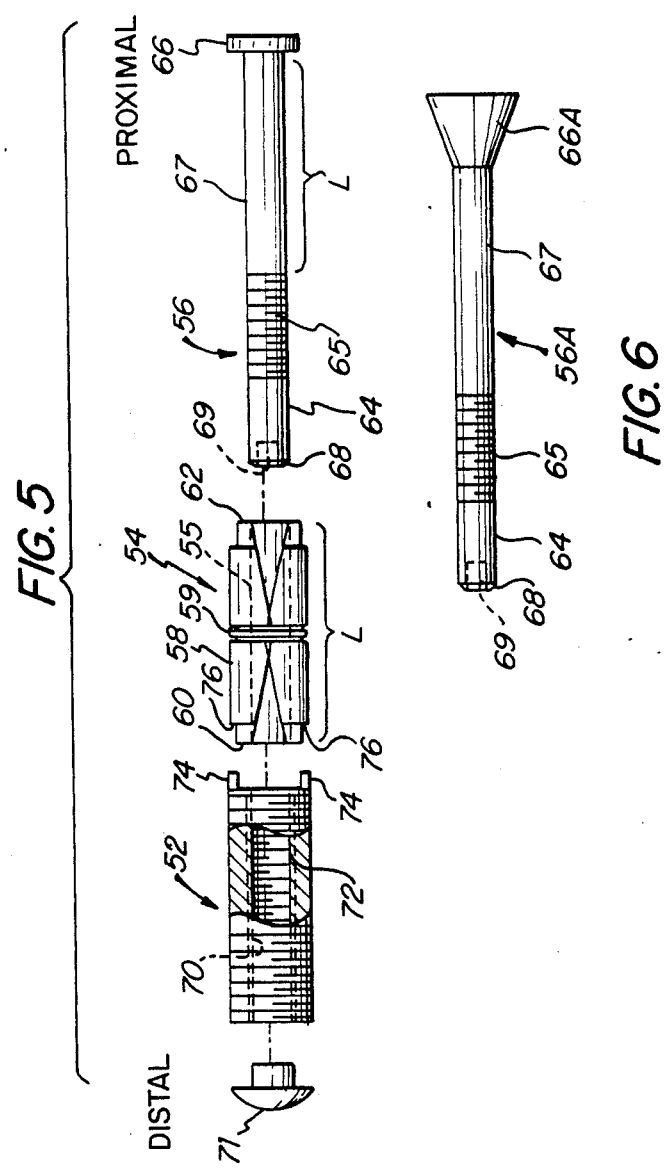
FIG. 5 is an exploded side view, partially in cutaway revealing a section thereof, of an alternate embodiment of the expansion anchor stud of this invention. This embodiment is claimed in the present application.
Figure 6:
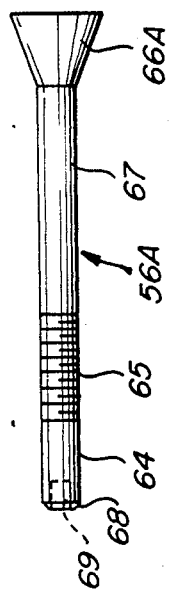
FIG. 6 is a side view of an alternate embodiment of the bolt component of the expansion anchor stud of FIG. 5, showing the head at the proximal end of the bolt unitary with the proximal expansion member of a double expansion shield.

Alternate embodiments of the expansion anchor stud are shown and described with respect to FIGS. 5 and 6. Throughout the description that follows, the terms "expansion shield" and "expansion anchor" are used interchangeably, and refer to a component of the expansion anchor stud such as is shown in FIG. 1.

DETAILED DESCRIPTION OF THE INVENTION

Figure 1:
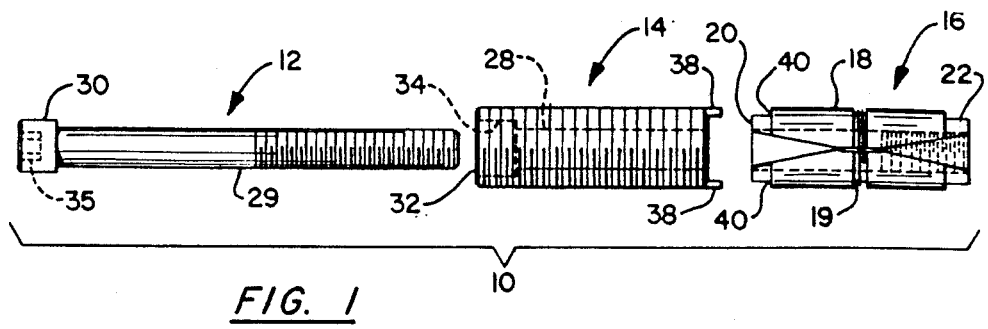
FIG. 1 is an exploded side view of an embodiment of the expansion anchor stud of this invention. This embodiment is claimed in copending U.S. Pat. No. 4,789,282, filed on Feb. 26, 1986 by the inventor hereof.

FIG. 1 shows an embodiment 10 of the expansion anchor stud of the invention. The expansion anchor stud comprises the following major axially-aligned components:
a bolt 12;
an externally threaded stud 14; and
an expansion shield (anchor) 16.

The expansion shield (anchor) 16 is of the double expansion type, having an axially-split, generally cylindrical, two-piece housing 18 held together by a circumferential clip 19 about its midsection, and having frustro-conical, wedge-like expansion members 20 and 22 disposed at either end thereof, one member 20 being disposed at the distal end of the housing and the other member being disposed at the proximal end of the housing, and the members 20 and 22 extending within the housing.

The bolt 12 has a shank 29, a proximal portion of which is externally threaded, and has a head 30 of larger diameter than the shank.

The distal expansion member 20 has an axial hole therethrough for allowing the shank 29 of the bolt 12 to pass therethrough. The proximal expansion member 22 has an axial hole therethrough which is threaded, internally, to receive the external threads on the proximal portion of the bolt 12.

Figure 2:
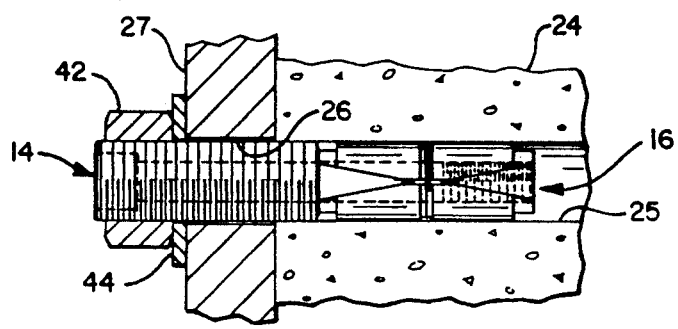
FIG. 2 is an assembled side view of the expansion anchor stud of FIG. 1. The illustration has applicability to the embodiment of FIG. 5.

The threaded stud 14 has an outside diameter substantially the same as the outside diameter of the housing 18. Thus, as shown in FIG. 2, a hole 26 in a panel 27 to be mounted by the expansion anchor stud 10 to the surface 24 may be substantially the same diameter as the hole 25 in the surface. This means, among other things, that the hole 25 in the surface 24 and the hole 26 in the panel may be drilled in one operation, with the panel already in place against the surface.

The stud 14 is externally threaded, and has an axial hole 28 therethrough slightly larger than the diameter of the bolt shank 29 so that the bolt 12 may be inserted through the stud 14 into the expansion shield 16.

The head 30 of the bolt 12 is larger in diameter than the hole 28 in the stud 14 so that the distal end of the stud 14 acts as a "stop", thereby limiting the proximal axial motion of the bolt 12 when it is threaded into the proximal member 22 of the expansion shield 16.

When the bolt 12 is threaded (rotated) into the proximal expansion member 22 and restrained from further axial motion while continuing to be threaded, the proximal expansion member 22 is drawn distally into the housing 18, causing expansion thereof. Similarly, when the bolt 12 is tightened, the distal expansion member 20 is drawn proximally into the housing 18, causing expansion thereof. Such expansion of the housing 18 causes the expansion shield 16 to grip a surface 24 in a hole 25 therein. When the expansion shield 16 is fully expanded, it is firmly seated within the hole 25 in the surface 24.

The bolt 12 is, of course, longer than the stud 14 so that its proximal end extends sufficiently past the proximal end of the stud 14 to engage the proximal expansion member 22.

It is preferable that the head 30 of the bolt 12 be flush with the distal end surface 32 of the stud 14, or even slightly recessed therein. Therefore, a recess 34 corresponding to the axial depth and outside diameter of the bolt head, or even slightly deeper and larger, is provided in the distal end surface 32 of the stud 14. Such a recessed-type head arrangement requires a screwdriver slot or Allen wrench recess 35 in the head of the bolt for tightening.

Figure 3:
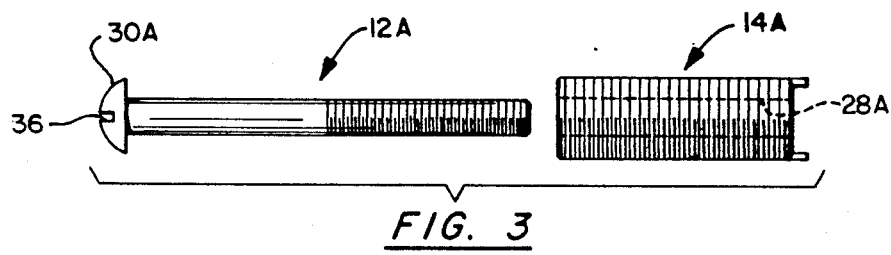
FIG. 3 is a side view of an alternate embodiment of the bolt component of the expansion anchor stud of FIG. 1

In FIG. 3, an alternate embodiment is shown wherein the hole 28A through the stud 14A is of continuous diameter (having no recess 34), in which case the head 30A of the bolt 12A has an outside diameter corresponding to the outside diameter of the stud 14A, and is provided with a slot 36 for the flat blade of a screwdriver.

It is, of course, the ultimate object of this invention that the stud 14 be firmly seated relative to the surface 24. This is achieved by rotationally interlocking the proximal end of the stud 14 and the distal end of the shield 16. As shown in FIG. 1, this is conveniently achieved by providing axially-extending prongs 38 on the outside diameter of the proximal end of the stud 14, and corresponding axially-extending, prong-receiving notches 40 on the outside diameter of the distal end of the shield 16. The notches 40 may be on the housing 18 itself, or may be provided as "flats" on the distal expansion member 20.

Figure 4:
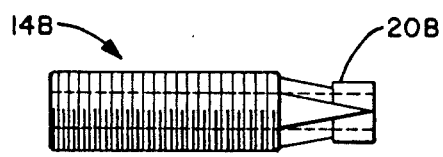
FIG. 4 is a side view of an alternate embodiment of the stud component of the expansion anchor stud of FIG. 1. This illustration has applicability to the embodiment of FIG. 5.

FIG. 4 shows an alternate technique for rotationally interlocking the stud 14B and the distal expansion member 20B. In this embodiment, the stud 14B and the distal expansion member 20B are formed as a unit, such as by cold forming from a single piece of stock.

The above described embodiment 10 of the expansion anchor stud of this invention has been described and claimed in copending U.S. Pat. No. 4,789,282, filed on Feb. 26, 1986. There follows a description of an alternate embodiment 50 of the expansion anchor stud of this invention, which is claimed herein.

FIG. 5 shows an alternate embodiment 50 of the expansion anchor shield of this invention. The expansion anchor stud 50 of this invention comprises the following major axially-aligned components:
an externally threaded stud 52;
an expansion shield or anchor 54; and
a bolt 56.

For descriptive consistency, the ends of the elements 52-56 towards the left side of the drawings are designated as the "distal" ends, and the ends of the elements 52-56 towards the right side of the drawings are designated as the "proximal" ends.

The expansion shield 54 is of the double expansion type, having an axially-split, generally cylindrical two-piece housing 58 held together by a circumferential clip 59, and having frustro-conical, wedge-like expansion members 60 and 62 disposed at either end and extending within the housing. The proximal expansion member 62 has an axial hole therethrough for allowing the bolt 56 to pass therethrough. The distal expansion member 60 has an axial hole therethrough for allowing the bolt 56 to pass therethrough.

The stud 52 has external threads 64 for receiving, in use, a nut for securing a panel to a surface, such as is illustrated by the nut 42 in FIG. 2. Such as is shown in FIG. 2, the expansion shield 54 fits within a hole 25 in a surface 24, and the stud 52 extends out of the surface 24, through a hole 26 in a panel 27 for attaching the panel 27 to the surface 24.

The bolt 56 has a shank 64, a distal portion 65 of which is externally threaded, and a head portion 66 which is larger in diameter than the shank portion 64.

As shown in FIG. 5, the head portion 66 is simply a disc-like flange which, as will be discussed in greater detail hereinafter, serves as a stop against the proximal end of the expansion shield 54. A proximal portion 67 of the bolt shank 64 is not threaded, and is of sufficient length, L, to pass through the length, L, of the anchor 54. The distal end of the bolt 56 has a recess 69 for receiving a tool to rotate the belt.

The stud 52 has an axial hole 70 therethrough, at least a portion 72 of which is internally threaded to receive the external threads 65 on the shank 64 of the bolt 56. Preferably, the overall length of the bolt 56 is established so that its distal end 68 is recessed within the stud hole 70, in other words, so that the distal end 68 of the bolt 56 does not protrude out past the distal end of the stud 52. In this manner, a plug 71, such as a rubber or plastic plug, can be inserted into the distal end of the stud hole 70 to keep moisture, dirt and the like out of the hole 70 and off of the bolt shank 64.

In practice, means are provided for rotationally interlocking the stud 52 and the expansion shield 54. In a like manner to that shown in FIG. 1, such means may comprise axially-extending prongs 74 on the outside diameter of the proximal end of the stud 52, and corresponding prong-receiving notches 76 on the outside diameter of the distal end of the expansion shield 54. The notches 76 may be on the housing 58, or may be provided as "flats" on the distal expansion member 60.

In a similar manner to that shown in FIG. 4, an alternative technique for rotationally interlocking the stud 52 and the shield 54 is to form the stud 51 and the distal expansion member 60 as a unit, such as by cold forming them from one piece of stock.

The distal end 68 of the bolt 56 is provided with means 69 for receiving a tool (not shown) for rotating the bolt 56. The means 69 for receiving the tool may be a hexagonal recess for receiving an Allen wrench, a slot for receiving the flat blade of a screwdriver or a crossed slot for receiving the tip of a Phillips head screwdriver.

The head 66 of the bolt 56 is larger in diameter than the hole 55 through the anchor 54 so that the proximal end of the anchor 54 acts as a "stop", thereby limiting the distal axial motion of the bolt 56 when it is threaded (rotated) into the stud 52.

When the bolt 56 is threaded (rotated) into the stud 52, and restrained from further distal axial motion while continuing to be threaded, the proximal expansion member 62 is drawn distally into the housing 58, causing expansion thereof. Similarly, when the bolt 56 is tightened, the distal expansion member 60 is drawn proximally into the housing 58, causing expansion thereof. Such expansion of the housing 58 causes the expansion shield 54 to grip a surface 24 in a hole 25 therein. When the expansion shield 54 is fully expanded, it is firmly seated within the hole 25 in the surface 24.

The bolt 56 is, of course, longer than the anchor 54 so that its distal end extends sufficiently past the proximal end of the anchor 54 to engage the internally threaded portion 72 of the stud 52.

As mentioned hereinbefore, the bolt 56 is rotated to compress and expand the shield 54 within a hole in a surface. The tool for tightening the bolt 56 would be inserted through the distal end of the stud 52. For the sake of convention, in other words tightening the bolt 56 by rotating the tool clockwise, it is preferable that the external threads 65 on the bolt 56 and the internally threaded portion 72 of the stud 52 both be threaded with "left hand" threads.

FIG. 6 shows an alternate embodiment 56A of the bolt 56. The bolt 56A has a shank 64, a portion 65 of which is externally threaded and a portion 67 of which is not threaded, and the distal end 68 has a recess 69 for receiving a tool to rotate the bolt 56A, all in accordance with the description of the bolt 56 of FIG. 5. However, the bolt 56A has a head 66A which is formed as a unitary member with the proximal expansion member 62 of the expansion anchor 54, with one exception. Whereas the proximal expansion member 62 if a standard double expansion shield 54 is rotationally interlocked with the housing 58 thereof, the head 66A of the bolt 56A is free to rotate within the housing 58. This is simply achieved by making the head 66A of the bolt 56A conical, as shown.

It is evident that the shear strength of the stud 52 is diminished by the hole 70 therethrough, and that the bolt 56 shares in any shear stress placed on the expansion anchor stud 50. Therefore, it is a consideration that the overall shear strength of the stud 52 and the bolt 56 be equivalent to that of a solid stud (no hole therethrough) of the same diameter as the stud 52. This may determine the stock selection for the bolt 52.

For similar reasons, it is a consideration that the tensile strength of the bolt 56 be selected so as to compensate for the reduction in tensile strength of the stud 52 caused by the hole 70 therethrough. Furthermore, the tensile strength of the bolt 56 ought to be well matched with the tensile strength of the stud 52.

FIG. 2 shows the expansion anchor stud 10 seated within the surface 24. As shown therein, the last few threads on the proximal end of the stud 14 are seated within the surface 24, in the hole 25. This provides additional stability to the stud 14, and is simply accomplished by ensuring that the hole 25 is slightly deeper than the anchor 14. In a similar manner, the stud 52 is preferably seated slightly within the hole 25 in the surface 24.

FIG. 2 shows a washer 44 and a nut 42 threaded onto the distal end of the stud 14 to secure the panel 27 to the surface. In a similar manner, a nut and washer would be used to secure the panel 27 to the surface 24 when using the embodiment 50 of the expansion stud anchor.

Various advantages accrue to the embodiment 50 over the embodiment 10 of the expansion anchor stud of this invention. For instance, the recess 34 in the stud 14 tends to weaken the stud 14. Such a recess is not required in the stud 52. Furthermore, an additional machining step is required to form the recess 34, which is not required in the stud 52. In the embodiment 10, the bolt head 30 is necessarily small. By contrast, the bolt head 66 in the embodiment 50 can be quite large, as large as the outside diameter of the expansion shield 54.

A highly preferable embodiment of the invention would combine the best features of both the embodiments 10 and the embodiments 50 of the expansion anchor stud. For instance, the feature of forming the distal expansion member 20 as the proximal end of the stud 54 (shown as 14B in FIG. 4) could be combined with the feature of forming the proximal expansion member 62 as the head 66A of the bolt 56A (as discussed with reference to FIG. 6).

Another advantageous possibility would be to form the stud 52 and shield 54 as one unit, as in the aforementioned Nicewarner, et. al. U.S. Pat. No. 1,513,669. However, this would not have the advantages of the double expansion type anchor that has been described above with respect to the embodiments 10 and 50 of the expansion stud anchor.

I claim:

1. An expansion anchor stud comprising:
   a threaded bolt having a shank of a first diameter and a head of greater diameter than the shank, the shank of said bolt having an externally threaded portion;
   an externally threaded stud of a second diameter, greater than the first diameter and having a hole therethrough for receiving the shank of the bolt, said hole through the stud having a threaded portion for engaging the externally threaded portion of the bolt; and
   an expansion anchor having an outside diameter substantially equal to the second diameter and having a hole therethrough for receiving the shank of the bolt;
   wherein the shank of the bolt extends through the expansion anchor and is rotatable relative to the stud to compress and expand the expansion anchor.

2. An expansion anchor stud according to claim 1, further comprising:
   means for rotationally interlocking the stud and the expansion anchor.

3. An expansion anchor stud according to claim 2, wherein:
   the means for rotationally interlocking the stud and the expansion anchor comprises axially extending prongs on the proximal end of the stud and corresponding prong-receiving notches on the distal end of the expansion anchor.

4. An expansion anchor stud according to claim 2, wherein:
   the expansion anchor is of the double expansion type having a first expansion member disposed at its distal end and a second expansion member disposed at its proximal end, and the first expansion member is unitary with the proximal end of the stud.

5. An expansion anchor stud according to claim 1, wherein:
   the distal end of the bolt is provided with means for receiving a tool for rotating the bolt relative to the stud.

6. An expansion anchor stud according to claim 5, wherein:
   the means for receiving a tool is a hexagonal recess for receiving an allen wrench.

7. An expansion anchor stud according to claim 5, wherein:
   the means for receiving a tool is a slot for receiving the blade of a screwdriver.

8. An expansion anchor stud according to claim 5, wherein:
   the means for receiving a tool is a crossed slot for receiving the tip of a Phillips head screwdriver.

9. An expansion anchor stud according to claim 1, wherein:
   the expansion anchor is of the double expansion type having a first expansion member disposed at its distal end and a second expansion member disposed at its proximal end, and the second expansion member is unitary with the head of the bolt.

10. An expansion anchor stud according to claim 9, wherein:
    the second expansion member is free to rotate relative to the remainder of the expansion anchor.

11. An expansion anchor stud according to claim 1, further comprising;
    means for rotationally interlocking the stud and the expansion anchor; and
    wherein the expansion anchor is of the double expansion type having a first expansion member disposed at its distal end and a second expansion member disposed at its proximal end, and the second expansion member is unitary with the head of the bolt.

12. An expansion anchor stud according to claim 11, wherein:
    the means for rotationally interlocking the stud and the expansion anchor comprises axially extending prongs on the proximal end of the stud and corresponding prong-receiving notches on the distal end of the expansion anchor.

13. An expansion anchor stud according to claim 11, wherein:
    the expansion anchor is of the double expansion type having a first expansion member disposed at its distal end and a second expansion member disposed at its proximal end, and the first expansion member is unitary with the proximal end of the stud.

* * * * *